(12) United States Patent
Spitalny

(10) Patent No.: US 9,449,487 B1
(45) Date of Patent: Sep. 20, 2016

(54) PET COMMUNICATION AND TRACKING SYSTEM

(71) Applicant: Taryl Spitalny, Canyon Country, CA (US)

(72) Inventor: Taryl Spitalny, Canyon Country, CA (US)

( * ) Notice: Subject to any disclaimer, the term of this patent is extended or adjusted under 35 U.S.C. 154(b) by 8 days.

(21) Appl. No.: 14/643,241

(22) Filed: Mar. 10, 2015

(51) Int. Cl.
*G08B 23/00* (2006.01)
*G08B 21/18* (2006.01)

(52) U.S. Cl.
CPC ..................................... *G08B 21/18* (2013.01)

(58) Field of Classification Search
None
See application file for complete search history.

(56) References Cited

U.S. PATENT DOCUMENTS

| D409,803 S | 5/1999 | Yoka | |
|---|---|---|---|
| 6,903,682 B1 * | 6/2005 | Maddox | A01K 15/023 342/357.55 |
| 7,602,302 B2 * | 10/2009 | Hokuf | A01K 11/008 340/539.13 |
| 7,710,263 B2 | 5/2010 | Boyd | |
| 7,856,947 B2 * | 12/2010 | Giunta | A01K 15/023 119/721 |
| 8,188,869 B2 | 5/2012 | Wangrud | |
| 8,314,695 B2 | 11/2012 | Greenberg | |
| 8,448,607 B2 * | 5/2013 | Giunta | A01K 15/023 119/721 |
| 8,543,134 B2 | 9/2013 | Lopez | |
| 8,851,019 B2 * | 10/2014 | Jesurum | A01K 15/023 119/721 |
| 2002/0196151 A1 * | 12/2002 | Troxler | A01K 15/023 340/573.4 |
| 2005/0034683 A1 * | 2/2005 | Giunta | A01K 15/023 119/721 |
| 2007/0107673 A1 | 5/2007 | Langer | |
| 2012/0182145 A1 | 7/2012 | Jameson | |
| 2012/0312250 A1 * | 12/2012 | Jesurum | A01K 15/023 119/721 |
| 2013/0157628 A1 | 6/2013 | Kim | |

FOREIGN PATENT DOCUMENTS

WO   WO2013022482   2/2013

\* cited by examiner

*Primary Examiner* — Travis Hunnings
(74) *Attorney, Agent, or Firm* — Kyle A. Fletcher, Esq.

(57) ABSTRACT

The pet communication and tracking system is a collar adapted for use with pets. The pet communication and tracking system comprises a location module for determining the location of the pet, and a communication module that allows a pet owner to determine the location of their pet as well. The pet communication and tracking system will also notify users when their pet leaves a predetermined geographic location. The pet communication and tracking system comprises a collar, a location module, a communication module, a logic module, and a power source.

12 Claims, 5 Drawing Sheets

PET COMMUNICATION AND TRACKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of navigation and animal care and handling, more specifically, a collar configured for use with pets.

SUMMARY OF INVENTION

The pet communication and tracking system is a collar adapted for use with pets. The pet communication and tracking system comprises a location module for determining the location of the pet and a communication module that allows a pet owner to determine the location of their pet as well. The pet communication and tracking system will also notify users when their pet leaves a predetermined geographic location.

These together with additional objects, features and advantages of the pet communication and tracking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet communication and tracking system in detail, it is to be understood that the pet communication and tracking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet communication and tracking system.

It is therefore important that the claims be regarded as including such equivalent construction insofar as they do not depart from the spirit and scope of the pet communication and tracking system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
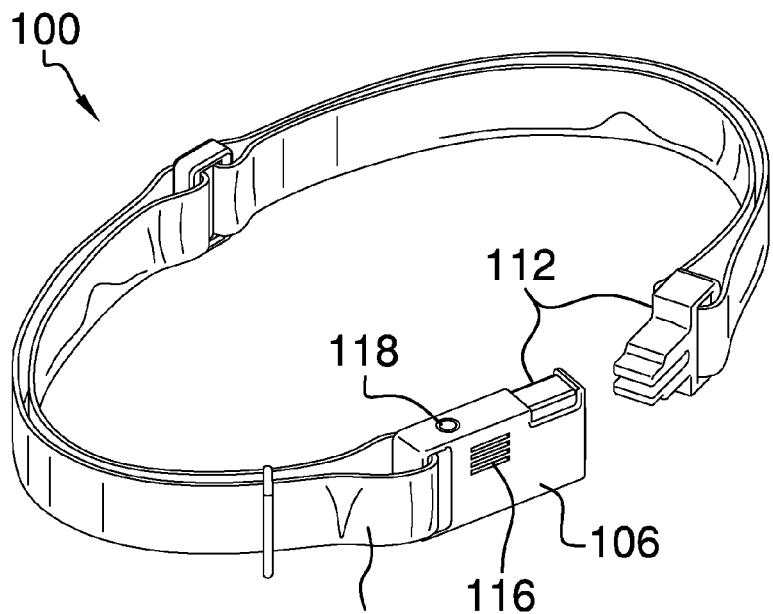
FIG. 1 is a perspective view of an embodiment of the disclosure.
Figure 2:
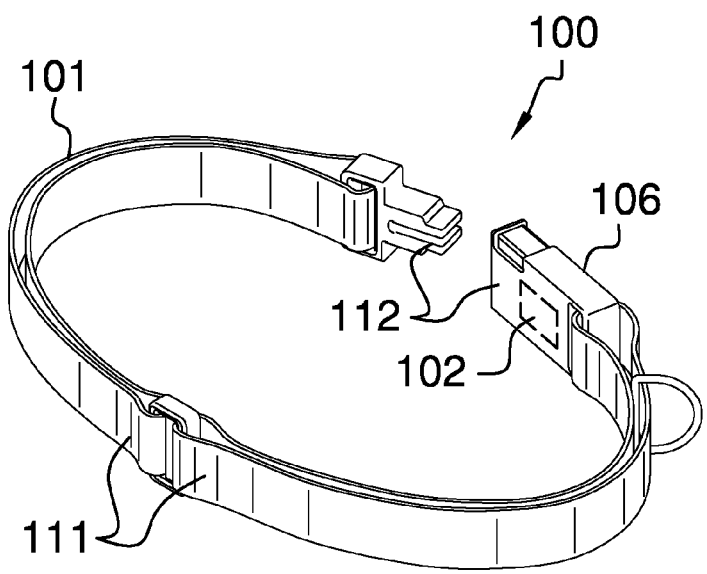
FIG. 2 is another perspective view of an embodiment of the disclosure.
Figure 3:
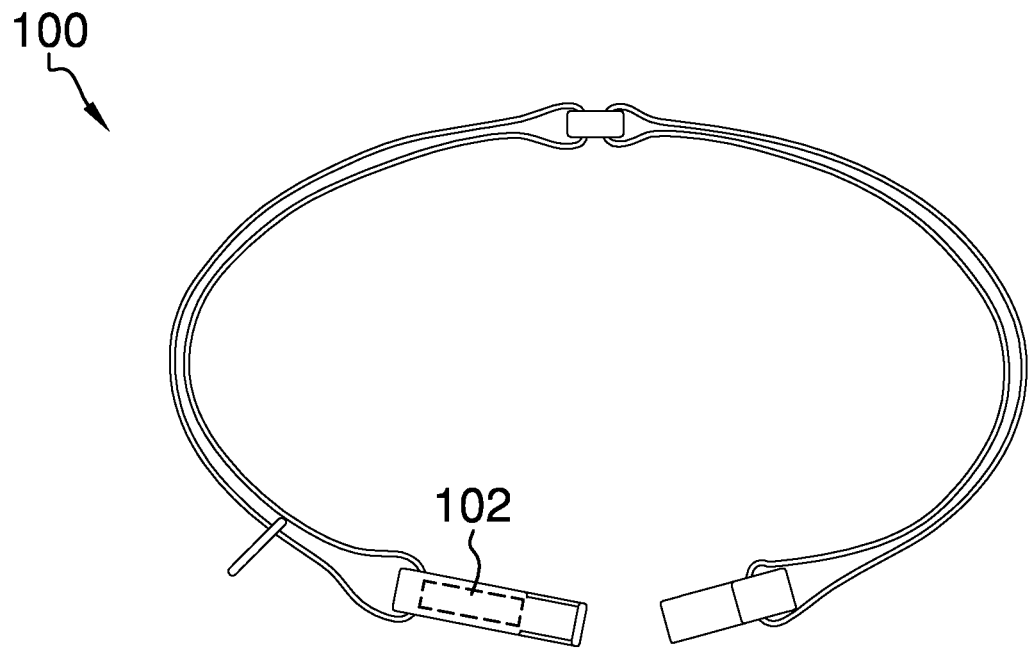
FIG. 3 is a top view of an embodiment of the disclosure.
Figure 4:
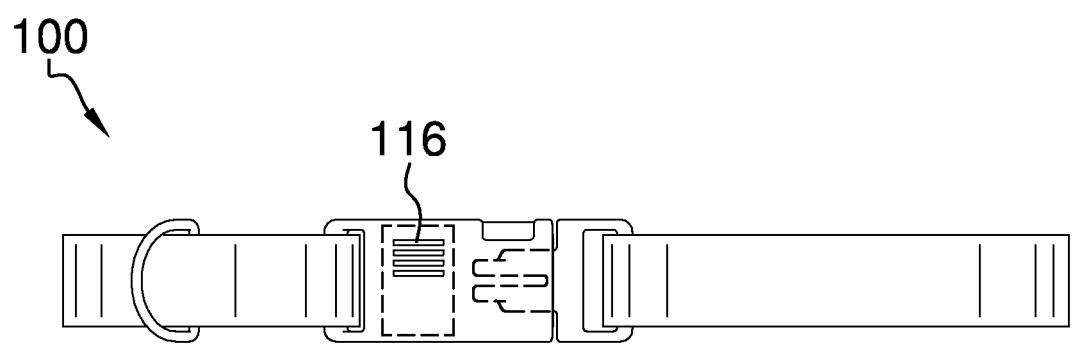
FIG. 4 is a front view of an embodiment of the disclosure.
Figure 5:
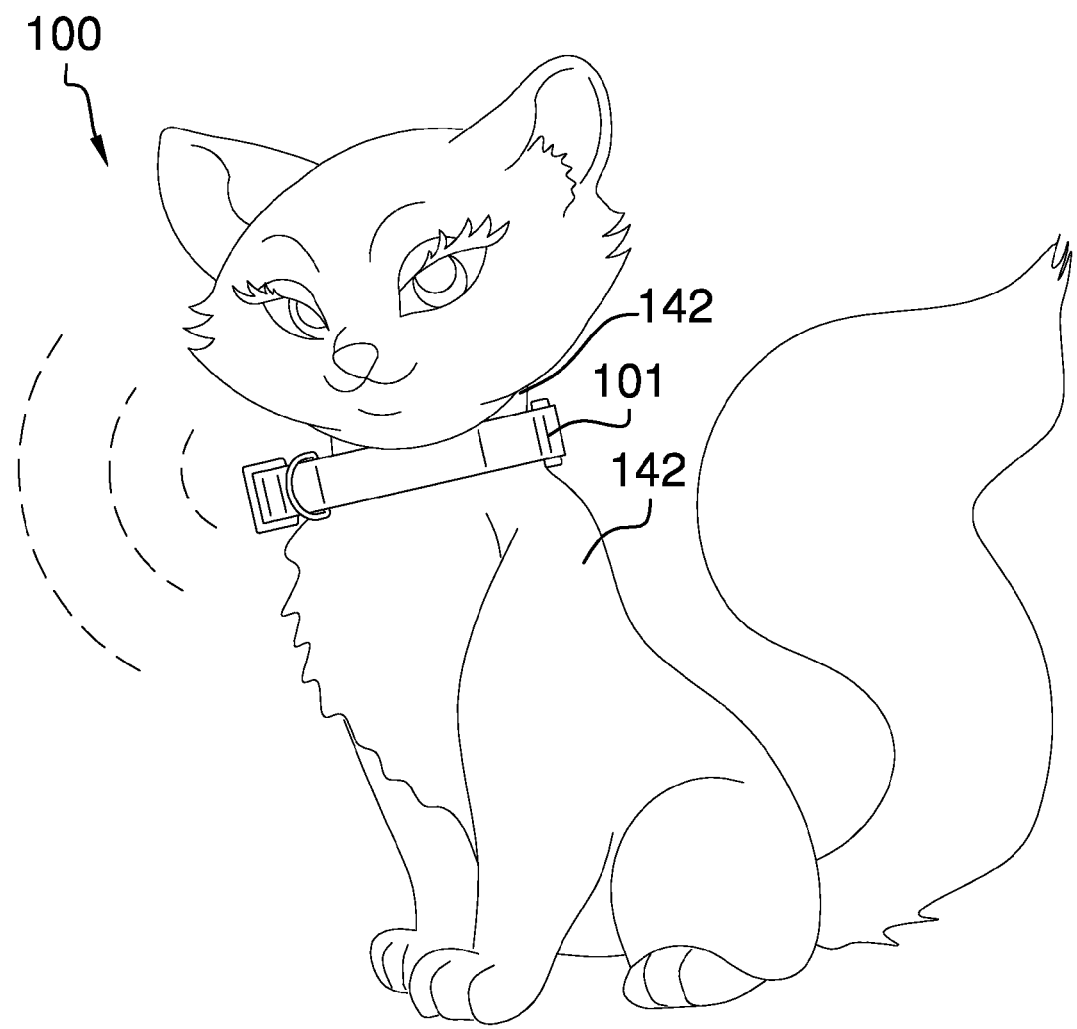
FIG. 5 is an in-use view of an embodiment of the disclosure.
Figure 6:
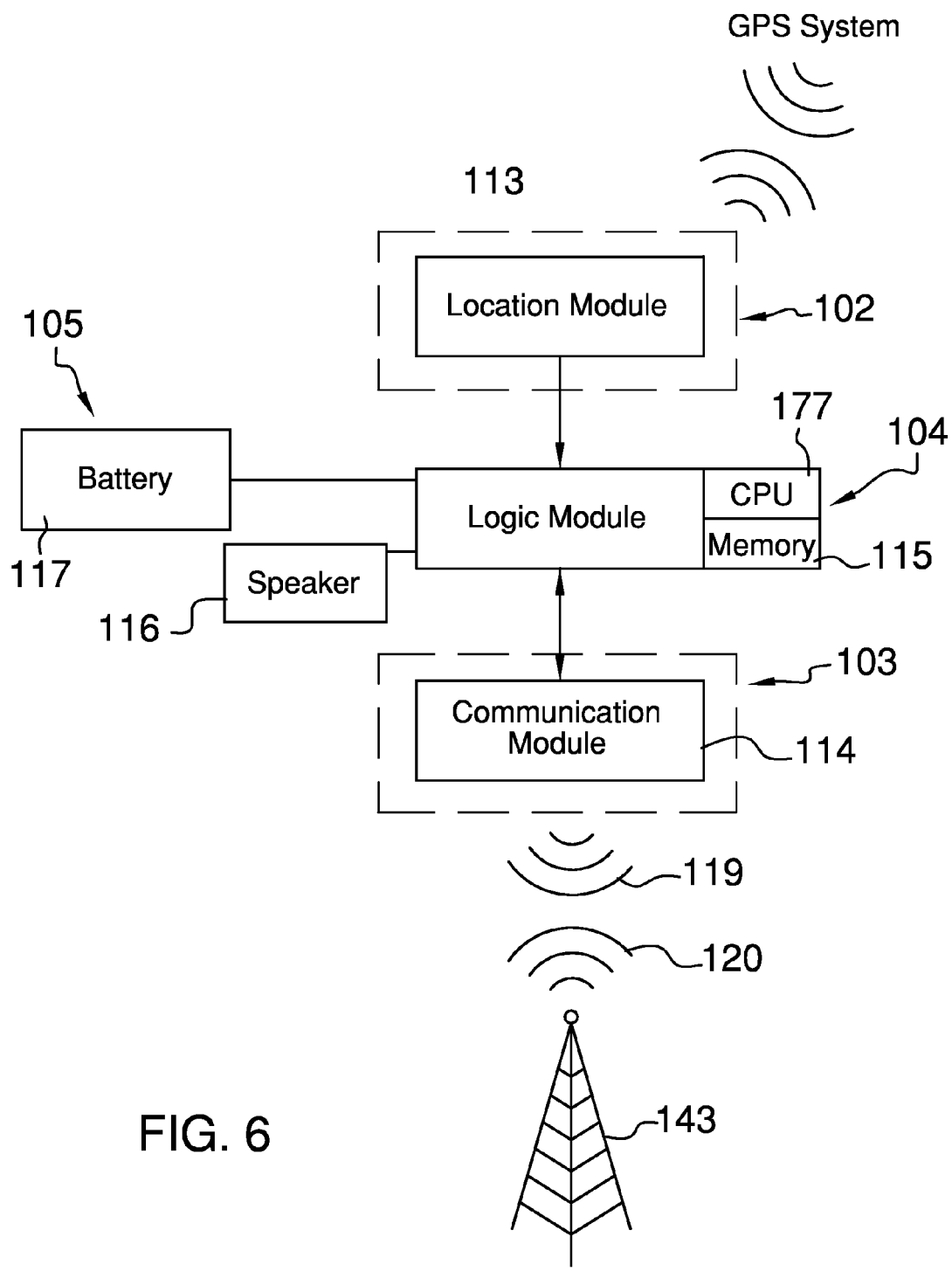
FIG. 6 is a functional view of an embodiment of the disclosure.
Figure 7A:
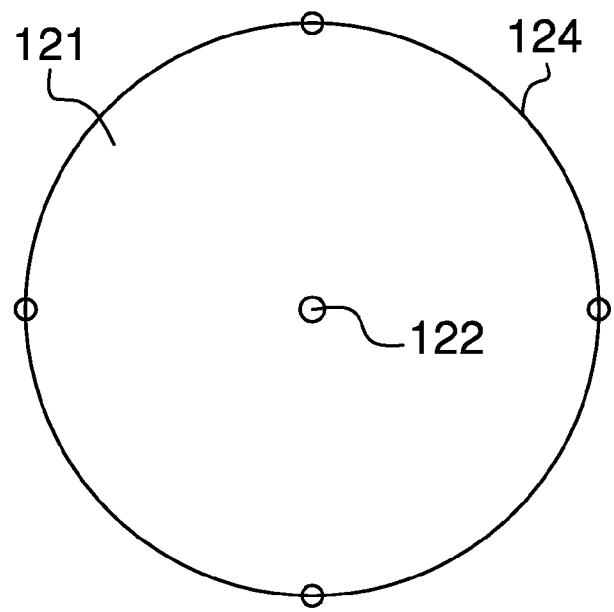
FIG. 7A is a detail view of a safe zone of an embodiment of the disclosure.
Figure 7B:
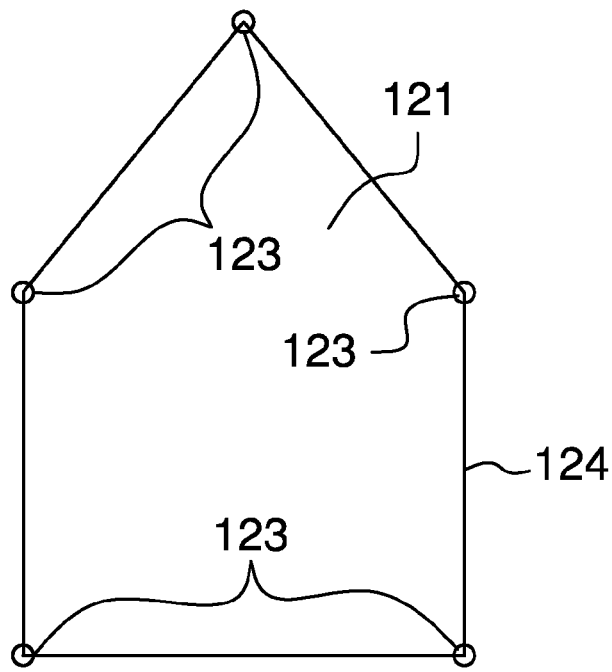
FIG. 7B is a detail view of a safe zone of an embodiment of the disclosure.

Detailed reference will now be made to a first potential embodiment of the disclosure, which is illustrated in FIGS. 1 through 7B. The pet communication and tracking system 100 (hereinafter invention) comprises a collar 101, a location module 102, a communication module 103, a logic module 104, a power source 105 and a housing 106.

The collar 101 comprises a webbing 111 and a buckle 112. The webbing 111 is a woven fabric that is used as a strap to wrap around the neck 142 of the pet 141. The buckle 112 is a snap buckle that used to fasten two ends of the webbing 111 to form a loop encircling the neck 142 of the pet 141. The buckle 112 can be commercially available. Alternatively the buckle 112 can be a custom made snap buckle that includes the housing 106 thereon.

The purpose of the location module 102 is to determine the location of the invention 100. The location module 102 further comprises a tracking device 113. The tracking device 113 can be a GPS based device, GPRS based device, or SMS based device. A GPS based device determines the location of the invention 100 using the Global Positioning System. A GPRS based device or a SMS based device determine the location of the invention 100 by using the cellular network 143.

The purpose of the logic module 104 is to: 1) monitor the location of the invention 100; 2) compare the location of the invention 100 to a predetermined safe zone 121; 3) to initiate outbound communication through the communication module 103; 4) to receive inbound communication from the communication module; 5) based on received inbound communications select a prerecorded message; 6) play the prerecorded message through a speaker 116; and 7) store a series of prerecorded messages in a storage device 115. In the second potential embodiment of the disclosure, the functions of the logic module 104 further comprises a microcontroller, a speaker 116, and a storage device 115. In the first potential embodiment of the disclosure, the functions of the logic module 104 are handled by the communication module 103.

The purpose of the communication module 103 is to manage inbound and outbound communication. The communications module 103 further comprises a communication device 114. The purpose of the communication module 103 is to send an out of bounds message 119 and to receive an instruction message 120 through a cellular network 143. The out of bounds message 119 comprises a predetermined message that includes the location of the invention 100. The instruction message 120 comprises a code that initiates: 1) the logic module 104 selecting a prerecorded message; 2) downloading the prerecorded message from the storage device 115; and, 3) playing the prerecorded message over the speaker 116. The instruction message 120 can also be used to: 1) load the safe zone 121 boundaries into the logic module 104; or 2) initiate the transmittal of an out of bound message 119. The out of bounds message 119 and the instruction message 120 are SMS (text) messages sent using GSM, CDMA, or GPRS system.

The power source 105 further comprises a battery 117 and a charging port 118. The purpose of the battery 117 is to provide electrical power for use by the location module 102, the communication module 103, and the logic module 104. The preference is that the battery 117 be rechargeable. The purpose of the charging port 118 is to connect the invention 100 to an external electrical power source to provide power to operate the invention 100, and to charge the battery 117. Optionally, the charging port 118 can also be used to load prerecorded messages and the safe zone 121 boundaries into the logic module 104.

The housing 106 is a casing that encloses and protects the location module 102, the communication module 103, the logic module 104, and the power source 105. The speaker 116 and the charging port 118 are mounted on the exterior of the housing 106. The housing 106 is adapted to attach to the collar 101. In the first potential embodiment of the disclosure, the housing 106 is custom made in the form of a snap buckle and performs the function of the buckle 112. In a third potential embodiment of the disclosure, the housing 106 is attached directly to the webbing 111 of the collar 101. The housing 106 can be attached to the collar 101 using several methods including, but not limited to: 1) using a hook and loop fastener; or, 2) forming a loop in the exterior of the housing 106 and passing the collar 101 through the loop.

The safe zone 121 boundaries can be determined in several ways including; but not limited to, the way used in the fourth potential embodiment of the disclosure and the way used in the fifth potential embodiment of the disclosure.

In the fourth potential embodiment of the disclosure, the safe zone 121 is determined from a single given location 122. The logic module 104 calculates distance between the current position of the invention 100 and the single given location 122. If the invention 100 is greater that a predetermined distance from the single given location 122, the invention 100 is out of the safe zone 121 and the out of bounds message 119 is sent.

In the fifth potential embodiment of the disclosure, the safe zone 121 is determined from a plurality of waypoints 123. The plurality of waypoints 123 are used to determine the perimeter 124 of the safe zone 121. Once the invention 100 leaves the perimeter 124 of the safe zone 121 the out of bounds message 119 is sent.

To use the invention 100, the prerecorded messages and waypoints (or single) location are entered into the logic module 104. If necessary, the invention 100 is then attached to the collar 101 and the collar 101 is then attached around the neck 142 of the pet 141. To charge the invention 100, the charging port 118 is attached to an external power source.

Commercially available GPS, CDMA, or GPRS/GSM tracker modules can be used for the location module 102. Commercially available cellular modules can be used for the communication device 114. A microcontroller can be used for the logic module 104. In the sixth potential embodiment of the disclosure, a commercially available Arduino microcontroller using a commercially available GPS shield and a commercially available cellular shield were used. The battery 117, collar 101, housing 106, speaker 116, and charging port 118 are commercially available. If the housing 106 is to replace the buckle 112, the webbing 111 is commercially available. If the housing 106 is to replace the buckle 112, the buckle 112 can be formed from molded plastic. Suitable plastic includes, but is not limited to, polyvinylchloride or polyethylene.

With respect to the above description, it is to be realized that the optimum dimensional relationship for the various components of the invention described above and in FIGS. 1 through 7B, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A communication and tracking system comprising:
   a location module, a communication module, and a logic module;
   wherein the communication and tracking system is adapted for use with a pet;
   wherein the communication and tracking system is adapted to send and receive wireless messages;
   wherein a collar is adapted to be worn around a neck of the pet;
   wherein the collar includes a buckle that fastens distal ends of the collar thereby forming a loop that is adapted to encircle the neck of the pet;
   wherein the buckle includes a housing that includes the location module, communication module, and the logic module therein;
   wherein the communication and tracking system is adapted to track the location of the pet;
   wherein the communication and tracking system issues a previously specified wireless message when the pet leaves a predetermined safe zone;
   wherein the communication and tracking system is able to receive wireless messages;
   wherein upon receipt of a wireless message, the communication and tracking system delivers an audible audio message to the pet;

wherein the location module determines the location of the pet;

wherein the logic module further comprises a microcontroller, a speaker, and a storage device;

wherein the logic module monitors the location of the communication and tracking system;

wherein the logic module compares the location of the communication and tracking system to the predetermined safe zone;

wherein the logic module initiates outbound communication through the communication module;

wherein the logic module receives inbound communication from the communication module;

wherein the logic module, based on received inbound communications, selects a prerecorded audible audio message;

wherein the logic module plays the prerecorded audible audio message through the speaker;

wherein the logic module stores a plurality of prerecorded audible audio messages in the storage device;

wherein the predetermined safe zone is based on a previously determined single given location;

wherein the logic module initiates the previously specified wireless message when the communication and tracking system is greater than a predetermined distance from the single given location.

2. The communication and tracking system according to claim 1 wherein the communication module manages inbound and outbound communication.

3. The communication and tracking system according to claim 2 wherein the outbound communication comprises the previously specified wireless message that further comprises the location of the communication and tracking system.

4. The communication and tracking system according to claim 3 wherein the previously specified wireless message is a text message.

5. The communication and tracking system according to claim 4 wherein the inbound communication comprises a received wireless message.

6. The communication and tracking system according to claim 5 wherein the received wireless message is a text message.

7. The communication and tracking system according to claim 1 wherein the logic module further comprises a microcontroller, a speaker, and a storage device;

wherein the logic module monitors the location of the communication and tracking system;

wherein the logic module compares the location of the communication and tracking system to the predetermined safe zone;

wherein the logic module initiates outbound communication through the communication module;

wherein the logic module receives inbound communication from the communication module;

wherein the logic module, based on received inbound communications, selects a prerecorded audible audio message;

wherein the logic module plays the prerecorded audible audio message through the speaker;

wherein the logic module stores a plurality of prerecorded audible audio messages in the storage device;

wherein the predetermined safe zone is determined from a plurality of waypoints;

wherein the plurality of waypoints define a perimeter;

wherein the logic module initiates the previously specified wireless message when the communication and tracking system is outside the perimeter for the predetermined safe zone.

8. The communication and tracking system according to claim 7 wherein the communication module manages inbound and outbound communication.

9. The communication and tracking system according to claim 8 wherein the outbound communication comprises the previously specified wireless message that further comprises the location of the communication and tracking system.

10. The communication and tracking system according to claim 9 wherein the previously specified wireless message is a text message.

11. The communication and tracking system according to claim 10 wherein the inbound communication comprises a received wireless message.

12. The communication and tracking system according to claim 11 wherein the received wireless message is a text message.

* * * * *